US012546135B2

(12) United States Patent
Perez et al.

(10) Patent No.: US 12,546,135 B2
(45) Date of Patent: Feb. 10, 2026

(54) BALLISTIC BARRIER PANEL FOR ENERGY TRANSMISSION EQUIPMENT

(71) Applicant: AMULET CRITICAL INFRASTRUCTURE, INC., Scottsdale, AZ (US)

(72) Inventors: Gene Perez, Scottsdale, AZ (US); Cory Smith, Scottsdale, AZ (US); Jeffrey Isquith, Scottsdale, AZ (US)

(73) Assignee: AMULET CRITICAL INFRASTRUCTURE, INC, Scottsdale, AZ (US)

( * ) Notice: Subject to any disclaimer, the term of this patent is extended or adjusted under 35 U.S.C. 154(b) by 44 days.

(21) Appl. No.: 18/408,242

(22) Filed: Jan. 9, 2024

(65) Prior Publication Data

US 2024/0263479 A1    Aug. 8, 2024

Related U.S. Application Data

(60) Provisional application No. 63/479,159, filed on Jan. 9, 2023.

(51) Int. Cl.
| | |
|---|---|
| *E04H 9/10* | (2006.01) |
| *A62C 3/16* | (2006.01) |
| *A62C 37/36* | (2006.01) |
| *E04B 1/78* | (2006.01) |
| *F41H 5/24* | (2006.01) |
| *G01L 5/14* | (2006.01) |

(52) U.S. Cl.
CPC ............... *E04H 9/10* (2013.01); *A62C 3/16* (2013.01); *A62C 37/36* (2013.01); *E04B 1/78* (2013.01); *F41H 5/24* (2013.01); *G01L 5/14* (2013.01)

(58) Field of Classification Search
CPC ............... F41H 5/24; A62C 3/16; E04H 9/10
See application file for complete search history.

(56) References Cited

U.S. PATENT DOCUMENTS

| | | | | |
|---|---|---|---|---|
| 4,555,991 A | * | 12/1985 | Bellezza | F41H 5/263 109/9 |
| 5,822,936 A | * | 10/1998 | Bateman | E04H 9/10 52/762 |
| 5,855,099 A | * | 1/1999 | Hoffman | E06B 9/00 49/57 |

(Continued)

*Primary Examiner* — Kristina R Fulton
(74) *Attorney, Agent, or Firm* — Perkins Coie LLP; Alberto Araiza; John Fuller

(57) ABSTRACT

The system comprises a mounting frame suspended above a ground level. The system comprises a modular panel configured to removably attach to the mounting frame and removably interconnect with other modular panels to form a barrier. The modular panel comprises multiple ballistic sub-panels that are configured to removably attach to the modular panel and interconnect with each other to increase the surface area of the modular panel and where each ballistic sub-panel is constructed of a ballistic-resistant material. The system comprises a ballistic detection system comprising at least one sensor configured to detect a ballistic event. The ballistic detection system comprises a notification system configured to communicate a notification to an emergency service in response to the ballistic event. The ballistic detection system comprises a controller configured to determine the severity of the ballistic event and activate the notification system and a power supply.

20 Claims, 16 Drawing Sheets

(56) References Cited

U.S. PATENT DOCUMENTS

| | | | | |
|---|---|---|---|---|
| 9,482,494 | B1* | 11/2016 | Lombardo | F41H 5/24 |
| 10,840,677 | B2* | 11/2020 | Leber | H01F 27/02 |
| 2013/0032310 | A1* | 2/2013 | Jaena | H05K 7/1497 |
| | | | | 165/138 |
| 2017/0030689 | A1* | 2/2017 | Ferguson | F41H 5/24 |
| 2018/0238659 | A1* | 8/2018 | Ferguson | F41H 5/013 |
| 2020/0114393 | A1* | 4/2020 | Frimpong | G01R 31/62 |
| 2021/0140189 | A1* | 5/2021 | White | E04H 9/16 |

* cited by examiner

BALLISTIC BARRIER PANEL FOR ENERGY TRANSMISSION EQUIPMENT

CROSS-REFERENCE TO RELATED APPLICATION

The application claims priority to U.S. Provisional Pat. App. No. 63/479,159, filed Jan. 9, 2023, titled Methods and Apparatus for Ballistic Barrier Panel, and is hereby incorporated by reference in its entirety.

BACKGROUND

A barrier is a physical structure that blocks or impedes something. A barrier can include any object or structure that creates an obstacle to control, block passage, or force the flow of traffic in the desired direction. A housing or enclosure is a container that can act as a protective exterior (e.g., barrier) or an enclosing structural element (e.g., chassis or exoskeleton) designed to enable easier handling, provide attachment points for internal mechanisms (e.g., mounting brackets for electrical components, cables, and pipes), maintain cleanliness of the contents by shielding dirt/dust, fouling, and other contaminations, or protect interior mechanisms (e.g. delicate integrated electrical fittings) from structural stress and/or potential physical, thermal, chemical, biological, or radiational damages from the surrounding environment.

BRIEF DESCRIPTION OF THE DRAWINGS

Detailed descriptions of implementations of the present invention will be described and explained through the use of the accompanying drawings.

Figure 1:
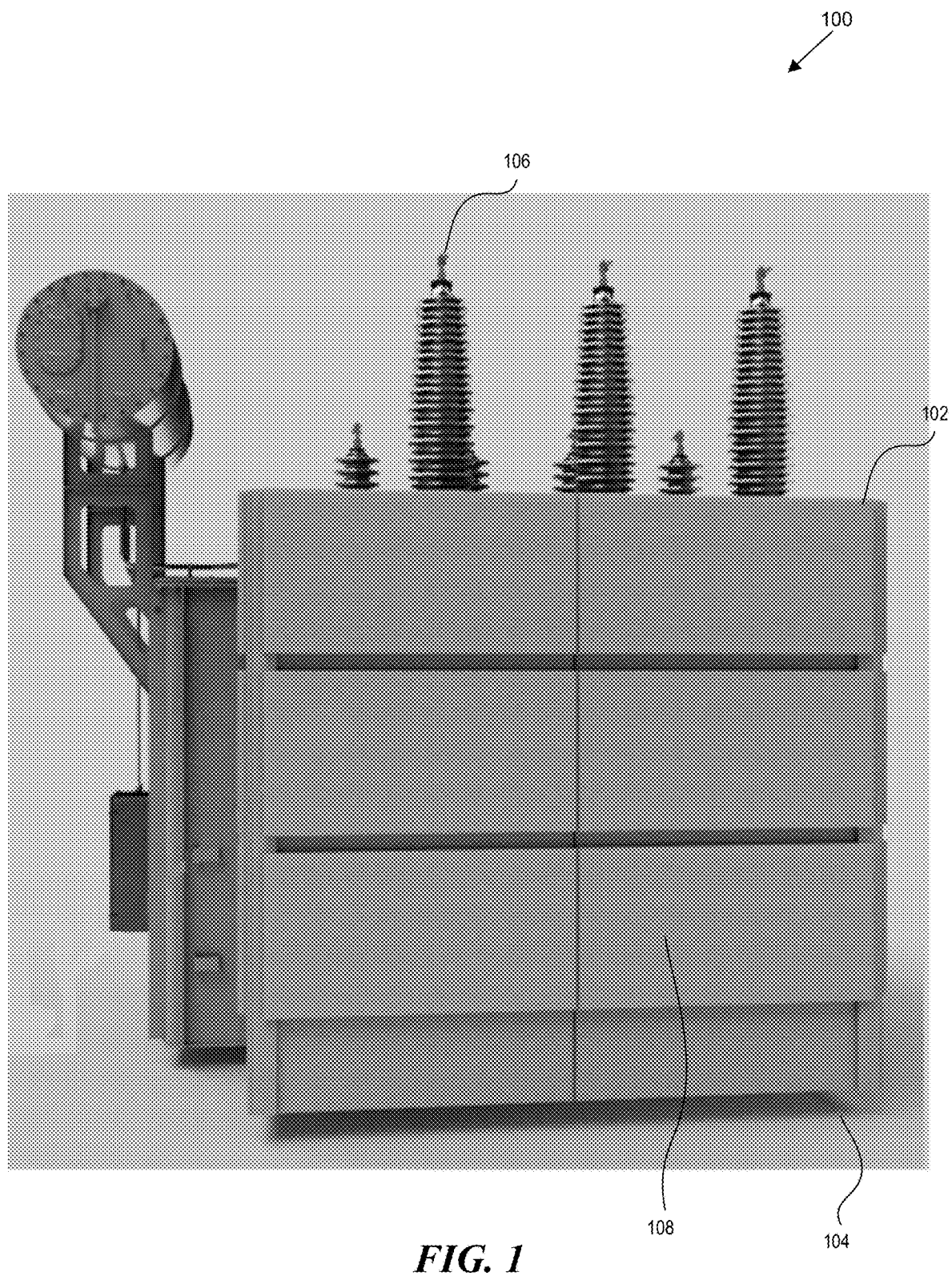
FIG. 1 illustrates a ballistic barrier system mounted to energy transmission equipment.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a modular ballistic barrier system capable of being deployed on energy transmission equipment such as a transformer and is directed toward the minimization or prevention of potential destruction and/or damage of electrical grid power transmission systems (e.g., electrical substations) from bullets, ballistic fragmentation, or a ballistic event. A substation is a part of an electrical generation, transmission, and distribution system. Substations transform voltage from high to low, or the reverse, or perform any of several other important functions. Electric power can flow through several substations at different voltage levels between the generating station and the consumer. A substation can include transformers to change voltage levels between high transmission voltages and lower distribution voltages or at the interconnection of two different transmission voltages. They are a common component of the infrastructure. There are 55,000 substations in the United States. Damage from a ballistic event can occur during a violent attack conducted by bad actors firing bullets at equipment and/or explosives or munition blasts. In addition, damage to or failure of equipment can occur due to an explosion of adjacent equipment experiencing a catastrophic failure.

Current measures intended to physically protect energy transmission equipment often consist of barrier structures. Most commonly, these structures act as, or are placed on, perimeter fencing. In some instances, large billboard-style protective shields can be deployed at or within the perimeter fence line near equipment. In practice, these measures do little to protect equipment from ballistic attacks originating from an elevated vantage point or from the air. The placement of these measures also leaves significant gaps, exposing equipment to attack. In addition, they offer no means of protecting equipment from other adjacent systems experiencing a catastrophic failure.

Current bullet and blast mitigation measures inadequately protect equipment and are often costly and time-consuming to implement. In addition, installing ballistic fence structures or billboard-style shields requires support structures or footings that are often impeded by hidden underground conduits attached to the equipment being protected. Further, these measures are difficult to scale in size because the majority of substations or equipment settings are too small to accommodate these structures.

Power grid transmission system components, particularly cooling systems, can also be damaged from the impact of bullets or blast fragmentation. This type of damage is often in the form of coolant leakage, which can lead to the overheating of the equipment and subsequent equipment failure. Because the damage cannot result in an immediate failure, damage can go undetected for a period of time, such as hours or even days following an attack or explosion, until a sufficient amount of coolant has leaked out and catastrophic equipment failure has occurred. This delay increases the likelihood of power loss and energy grid shutdown.

The modular ballistic barrier system prevents damage caused by ballistic events through the use of a mounting frame, modular panels, and a plurality of sensors. The mounting frame is the mechanism used to couple the ballistic panels to the energy transmission system in order to provide protection from a ballistic event. In one embodiment, the mounting frame can employ a plurality of earth magnets configured to allow the panel to be coupled to a metal housing or surface. In an alternative embodiment, the mounting frame can couple a ballistic panel to a location with an adhesive or other mechanical fastener system. In another embodiment, the mounting frame can employ multiple framing members secured directly to the energy transmission system, such as a high-voltage transformer, via existing attachment points, such as a grounding structure. In another embodiment, the mounting frame can support a fire suppression system capable of extinguishing a fire caused by a ballistic event, a failure of the energy transmission system, or other closely located electrical equipment.

The modular panel can be configured to be removably attached to the mounting frame and can consist of multiple ballistic sub-panels. The ballistic sub-panels can be formed as ultra-lightweight and thin hidden ballistic barriers configured to provide protection from a full spectrum of bullets, blast fragmentation, and forced penetration. The ballistic sub-panels can be manufactured from any suitable material, such as non-woven aramid, ultra-high-molecular-weight polyethylene (UHMPE), or other composites. In one embodiment, the ballistic sub-panels can be formed from materials that are light in weight and thickness to provide for minimal weight and flexibility while also meeting desired ballistic performance standards (e.g., National Institute of Justice/UL). The modular panels can be formed as ultra-light in weight and thin in profile to allow for single-personnel installation. In installations relating to electrical equipment or substations, the modular panel may be non-conductive and weather-resistant. In one embodiment, multiple ballistic sub-panels can be coupled together to increase the surface area of the ballistic barrier system. The modular nature of the modular panels allows for the removal of a single ballistic sub-panel when damage occurs due to a ballistic or some other event.

In one embodiment, the sensor can be linked to or otherwise connected to one or more ballistic sub-panels and be configured to detect the occurrence of a gunshot, physical impact, ballistic fragmentation, or other ballistic event. The sensor can comprise any suitable system or device for detecting a ballistic event. For example, the sensor can use energy-wave technology to detect and measure the energy level and waveform of the ballistic event. For example, energy-waveform technology and sensors were developed by the United States Department of Energy to analyze the energy level and waveform of a ballistic event to identify a ballistic event from other deafening sounds such as thunder or sirens.

A singular energy-wave sensor can detect a ballistic event in a predetermined radius around the ballistic vest, allowing detection of the ballistic event in scenarios when no ballistic fragmentation makes contact with the ballistic barrier system. In another embodiment, the sensor can be configured to autonomously notify first responders, security personnel, or other stakeholders of a detected event. The sensor can be configured to wirelessly transmit data concerning the detected event, such as location, time, or the type of event detected.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Ballistic Barrier Panel

FIG. 1 illustrates a ballistic barrier system 100 mounted to energy transmission equipment 106. The ballistic barrier system can include a modular panel 102. The modular panel 102 can be configured to provide protection from a ballistic event such as a gunshot, explosion, catastrophic failure of nearby electrical equipment, or another hazard. In one embodiment, the modular panel 102 can include multiple ballistic sub-panels 108. The ballistic sub-panels 108 can be removable, allowing for the replacement of a ballistic sub-panel 108 due to damage caused by a ballistic or other event. In one embodiment, the visible surfaces of the modular pane can be colored to match the equipment being protected to better blend into the installation.

The modular panel 102 can be configured to be mounted to existing energy transmission equipment 106 without the need to modify the structural components of the energy transmission equipment 106. The modular panel 102 can be mounted so as not to leave a gap 104 between the bottom of the modular panel 102 and the ground, meaning that the modular panel is suspended above the ground. The gap 104 can increase the airflow over the energy transmission equipment. The gap 104 allows the ballistic barrier system to be mounted to the energy transmission equipment 106 without the need to mount the ballistic barrier system into the ground surrounding the energy transmission equipment.

In another embodiment, the modular panel can surround the entire energy transmission equipment, including the bushings. For example, the ballistic barrier system 100 can include a roof structure. The roof structure can be constructed using the modular panel 102. For example, constructing the ballistic barrier system 100 with a roof can provide protection against airborne ballistic attacks, such as those caused by a drone attack.

Figure 2:
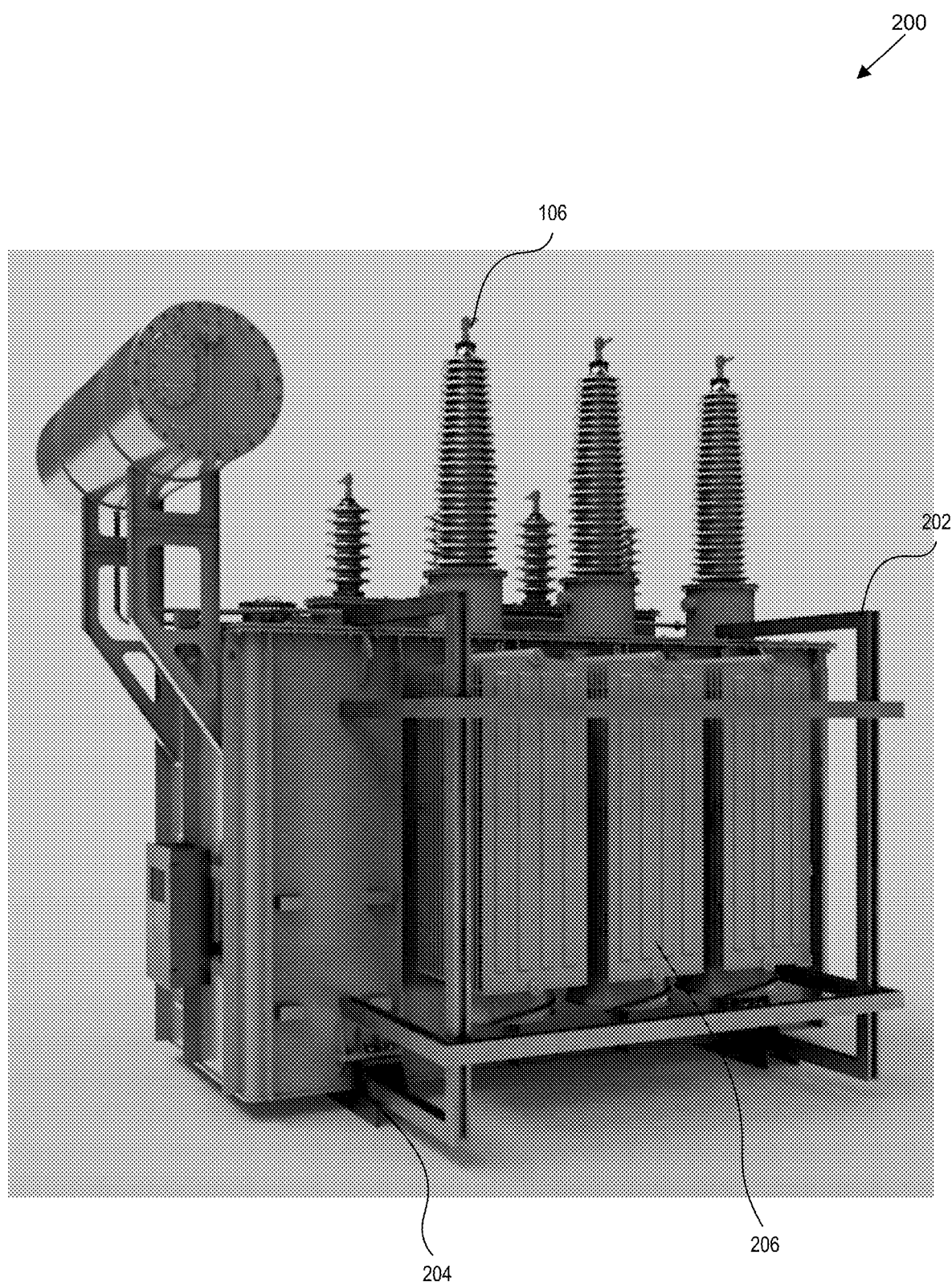
FIG. 2 illustrates an embodiment of the mounting frame for the ballistic barrier system.

FIG. 2 illustrates an embodiment 200 of the mounting frame 202 for the ballistic barrier system. The mounting frame 202 includes vertical frame members and horizontal frame members. The vertical frame members and horizontal frame members can form a cage around a radiator 206 of the energy transmission equipment 106. A modular panel can be mounted directly to the mounting frame 202. The modular panel can form a complete protective barrier around the radiator 206, preventing damage to the radiator 206 caused by a ballistic event.

In one embodiment, the mounting frame 202 can attach to an existing structural component 204 of the energy transmission equipment 106, such as an I-beam or H-beam. For example, the mounting frame 202 can be fastened to the structural component 204 through the use of fasteners, welding, or any other suitable attachment method. In another embodiment, the mounting frame is mounted directly to a component of the energy transmission equipment 106, such as the radiator 206, by welding the frame to the component.

Figure 3:
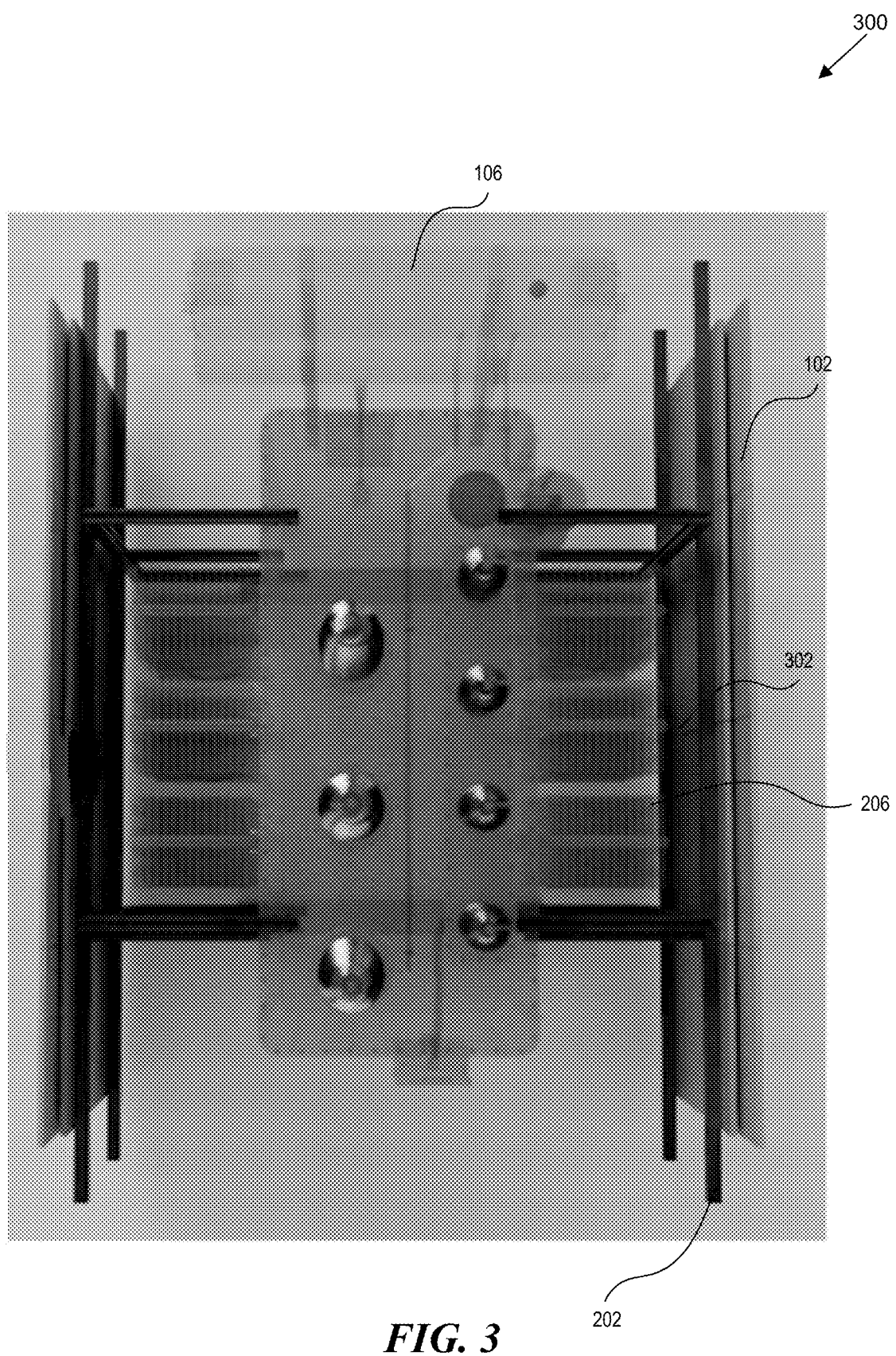
FIG. 3 illustrates an embodiment of the ballistic barrier system.

FIG. 3 illustrates an embodiment 300 of the ballistic barrier system. Embodiment 300 illustrates the ballistic barrier system configured to protect a heat exchanger such as a radiator 206. Maintaining airflow through the cooling system of an energy transmission equipment 106 is needed to keep the system cool. To maintain the proper temperature of the energy transmission system, the modular panel 102 can have a gap 302 from the radiator 206. The gap 302 can be determined based on the needs of the energy transmission system. In one embodiment, the modular panel 102 cannot be coupled directly to the radiator 206 without degrading the heat transfer capability of the radiator 206. The mounting frame 202 can be mounted to an existing support structure of the energy transmission equipment in order to not degrade the heat transfer capabilities of the radiator 206 and to form gap 302.

In another embodiment, the modular panel 102 can include hinged and/or angled louvered wall structures on both sides of the transformer radiator to not impede airflow for cooling. A hinged panel can also allow for ease of maintenance and for additional cooling methods to be added during times of high temperature.

In another embodiment, the modular panel 102 can include an insulation component with a predetermined thermal resistance (R) value. The insulation component can help regulate the temperature of the energy transmission equipment 106. The R-value of the insulation component can be adjusted based on the needs of the energy transmission equipment. For example, different R-values can be used for energy transmission equipment 106 located in regions with extreme temperatures where overheating is a problem compared to energy transmission equipment 106 located in more temperate regions.

In another embodiment, the modular panel 102 can include a solar-reflecting material coating. The reflecting material coating can be configured to reduce the amount of heat transferred from the sun to the energy transmission equipment 106. The reflecting material coating reduces the amount of heat transferred by reflecting an amount of solar energy. For example, the amount of solar energy needed to be reflected can be determined by the location of the energy transmission equipment 106.

For example, employing a modular panel 102 with thermal capabilities such as insulation or a solar-reflecting material coating can help reduce the heat transfer associated with high temperatures, which can improve the performance of and extend the life of the energy transmission equipment. Reducing the temperature of the energy transmission equipment during periods of high temperature can reduce the occurrence of energy transmission interruptions (commonly known as "brownouts") and equipment failure.

Figure 4:
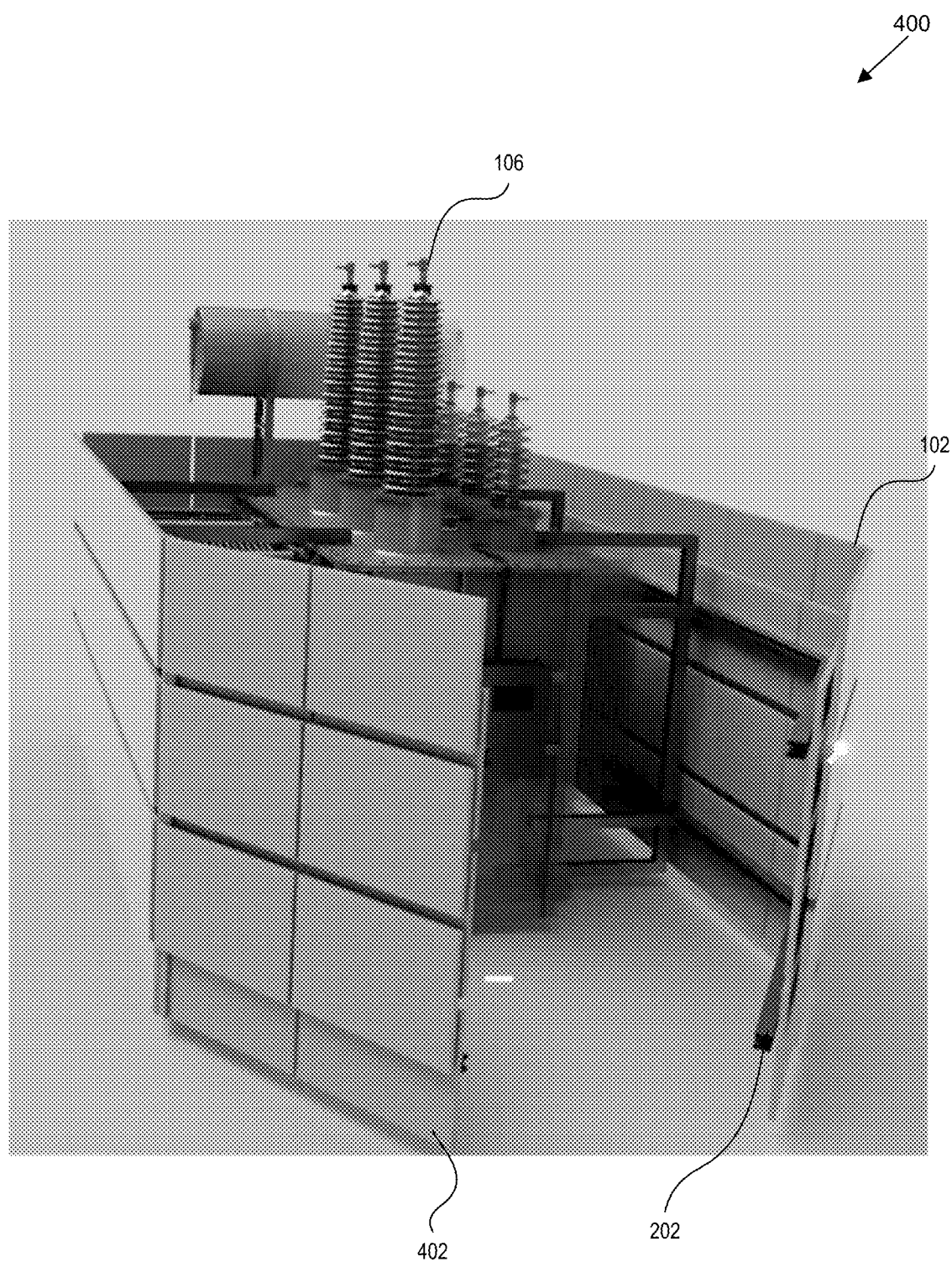
FIG. 4 illustrates an embodiment of the ballistic barrier system.

FIG. 4 illustrates an embodiment 400 of the ballistic barrier system. Embodiment 400 illustrates a ballistic barrier system that fully encompasses and wraps around the energy transmission equipment 106. Fully encompassing the energy transmission equipment 106 with the modular panels 102 can protect the energy transmission equipment 106 from a ballistic event on all sides. To facilitate the maintenance of the energy transmission equipment 106, the mounting frame 202 can include hinges and a door 402. In one embodiment, door 402 can include modular panels 102 to provide protection from a ballistic event. In another embodiment, door 402 encompasses an entire side of the energy transmission equipment 106 to allow easier access to the energy transmission equipment. The door 402 can include multiple doors to reduce the weight of door 402, allowing for easier maneuvering of the door 402 by a single person.

Figure 5:
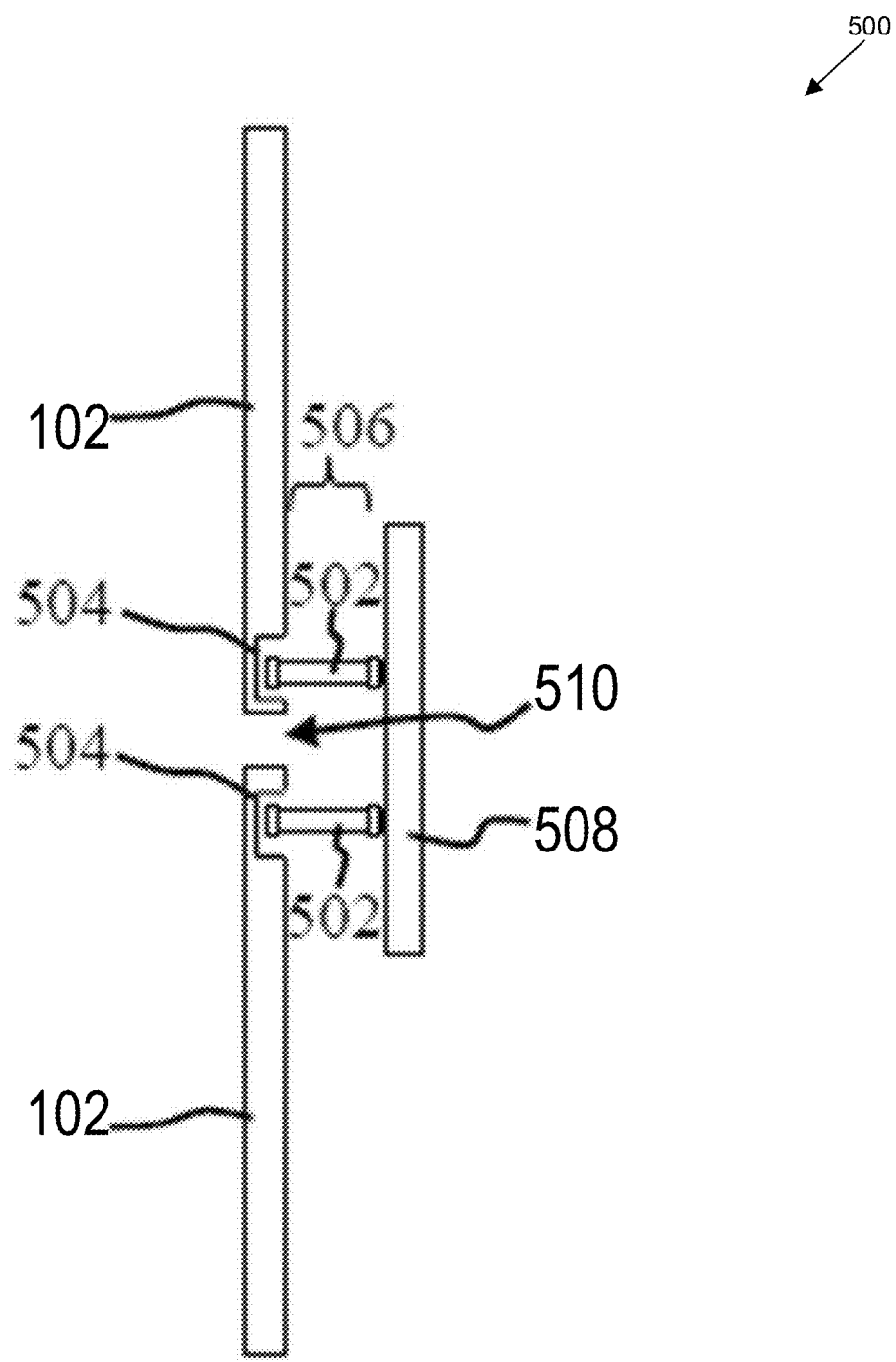
FIG. 5 illustrates a block diagram of the interlocking mechanism of the modular panel system.

FIG. 5 illustrates a block diagram 500 of the interlocking mechanism of the modular panel system. To address potential ballistic travel of bullets and ballistic fragmentation between ballistic barrier panels 102, a ballistic guard 508 constructed from the ballistic panel material can be positioned over the panel gap 510. The ballistic guard 508 can be of any suitable width to cover the panel gap 510. In one embodiment, the ballistic guard can have a width that goes beyond the width of the panel gap 510 by a predetermined distance. The ballistic guard 508 may be positioned at a distance from the ballistic panel 102, allowing airflow between and through panels 102 and the ballistic guard 508 while preventing a direct path through the ballistic panel system for which a projectile or fragment could pass.

The ballistic guard 508 can be connected to ballistic barrier panels 102 at the left and right or the top and bottom with any suitable fastening system or device. The fastening system can include one or more spacers 502 attached to both the ballistic panels 102 and the ballistic guard 508 to create a second gap 506 for airflow. Each facing ballistic barrier panel 102 may include at least one slot 504 for receiving the fastening system and spacer 502 to allow the ballistic panels 102 to be adjusted side-to-side relative to the ballistic guard 508 and an adjacent facing ballistic barrier panel 102 to control a width of the panel gap 510 and to adjust the overall ballistic panel system during installation or system maintenance. In one embodiment, the modular panel system is mounted to a radiator of energy transmission equipment, and the interlocking mechanism increases airflow through the radiator. Allowing for airflow around the radiator allows the energy transmission equipment to function properly while also providing protection from ballistic events.

Figure 6A:
FIG. 6*a* illustrates an embodiment of the interlocking mechanism of the modular panel system.

FIG. 6a illustrates an embodiment 600a of the interlocking mechanism of the modular panel system. Embodiment 600a has exterior-facing ballistic sub-panels 102 and an interior-facing ballistic guard 508. In this embodiment, panel gap 510 is exposed to the exterior of the modular panel.

Figure 6B:
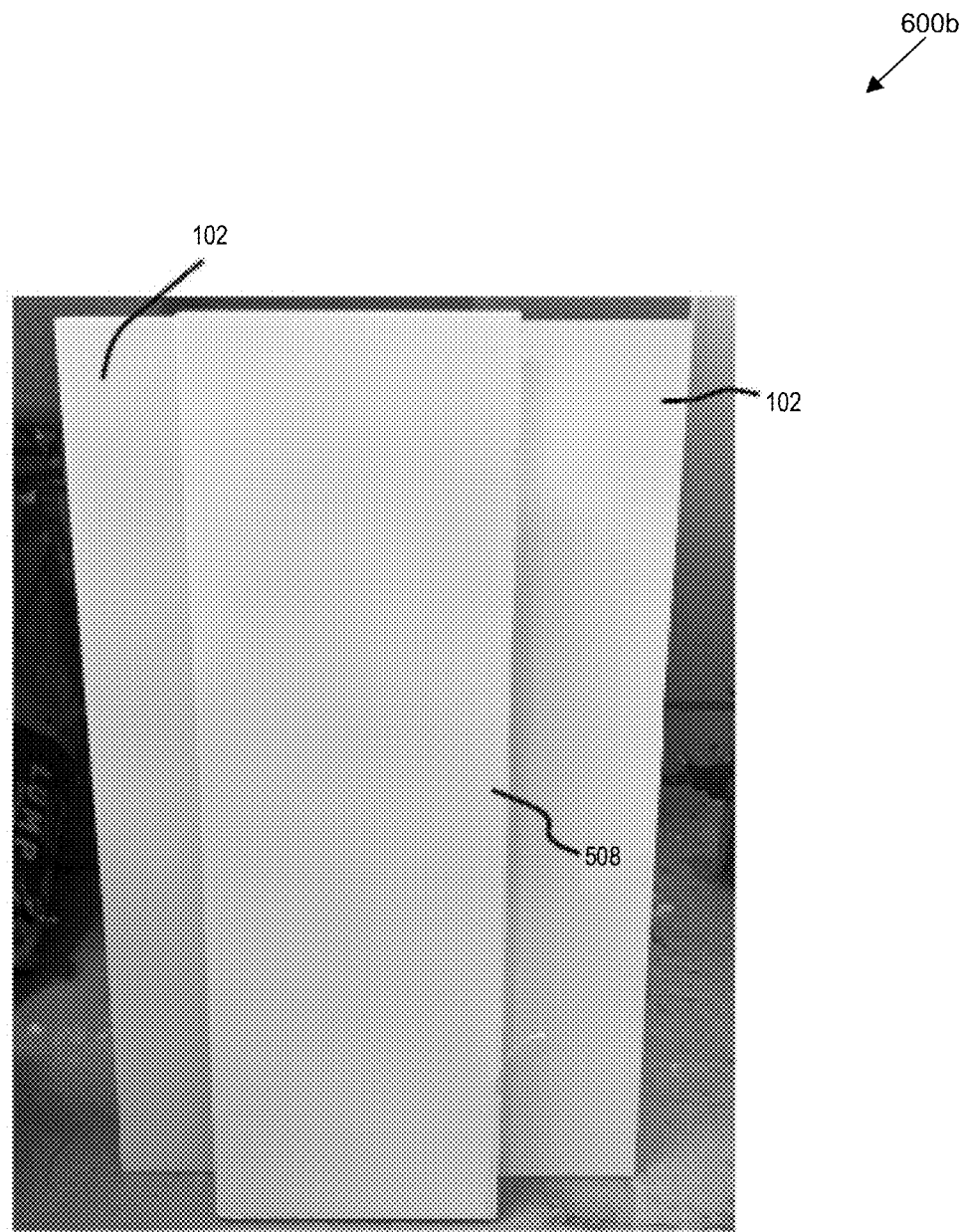
FIG. 6*b* illustrates an embodiment of the interlocking mechanism of the modular panel system.

FIG. 6b illustrates an embodiment 600b of the interlocking mechanism of the modular panel system. Embodiment 600b has interior-facing ballistic sub-panels 102 and an exterior-facing ballistic guard 508. In this embodiment, panel gap 510 is covered by the ballistic guard 508, meaning that the panel gap 510 is not exposed to the exterior of the modular panel.

Figure 7:
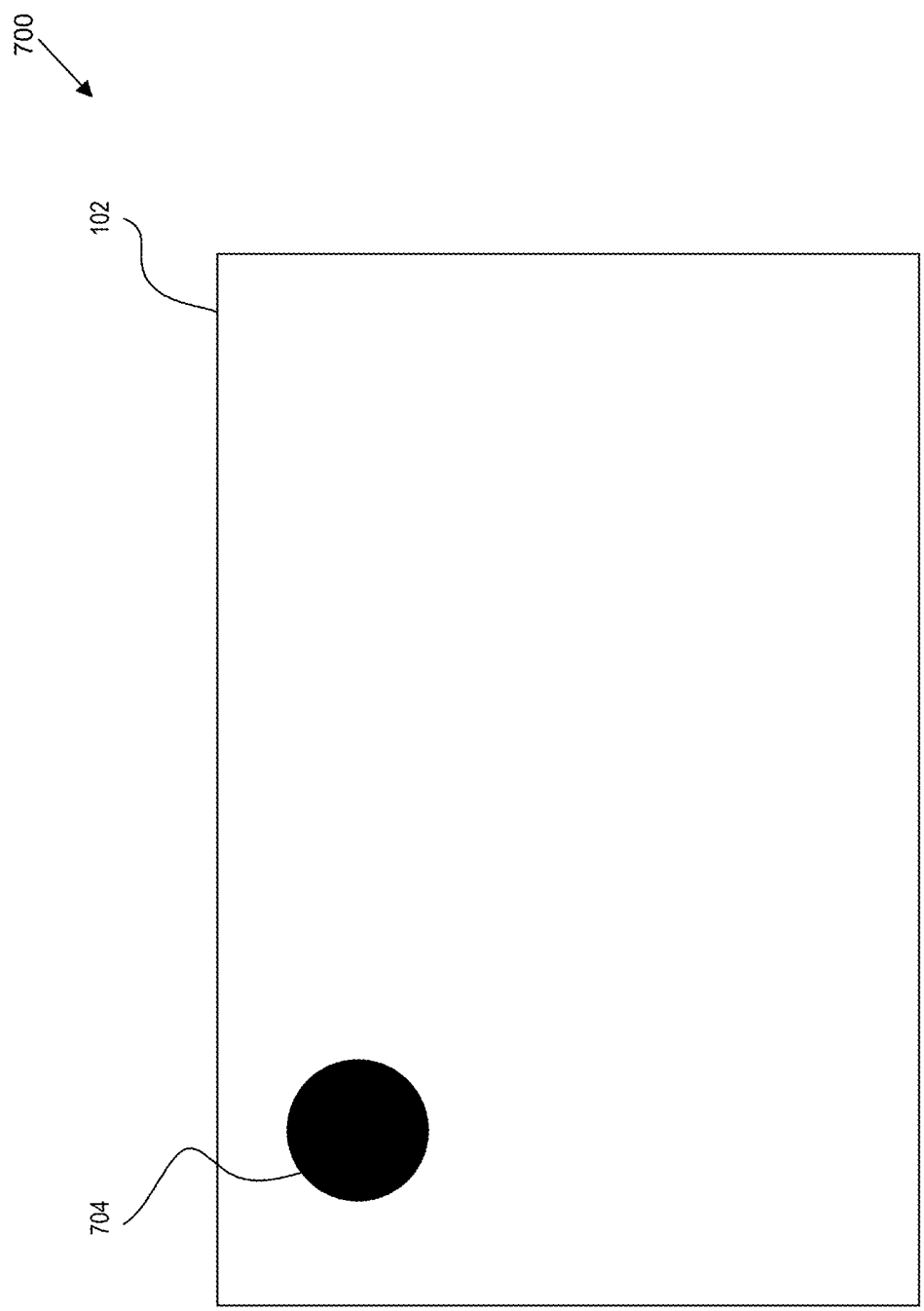
FIG. 7 illustrates a block diagram of a front-facing view of the modular panel.

FIG. 7 illustrates a block diagram of a front-facing view of the modular panel 700. The modular panel 700 can have a ballistic sub-panel 102 and at least one sensor 704. The ballistic sub-panel 102 can be configured to provide protection from impacts caused by projectiles. In one embodiment, the ballistic sub-panel 102 can be constructed from non-woven aramid and UHMPE material. In another embodiment, the ballistic sub-panel 102 can be constructed from a non-woven composite or metal material. The material can be lightweight with a variable thickness to meet a minimal weight and flexibility requirement in order to comply with a desired safety standard such as the National Institute of Justice or OSHA standards.

The sensor 704 can be an energy-wave detection sensor, an accelerometer, a microphone, a camera, or a pressure sensor. For example, the microphone can detect and record a sound profile of a ballistic event. In another example, the pressure sensor can detect and record a change in pressure caused by a ballistic event. In one embodiment, a computer or control system can control the sensor 704.

The sensor 704 can be attached directly to the ballistic sub-panel 102. In one embodiment discussed below in FIGS.

8*a* and 8*b*, the sensor 704 can be connected to an external power source with an electrical wire going through the ballistic panel. In another embodiment discussed below in FIGS. 8*c* and 8*b*, the sensor 704 and power source can be a single unit where the power source is mounted in the same location as the sensor 704. In one embodiment discussed below in FIGS. 8*a* and 8*c*, the sensor 704 can be mounted to the surface of the ballistic sub-panel 102. In another embodiment discussed below in FIGS. 8*b* and 8*d*, sensor 704 can be embedded into the ballistic panel 102.

Figure 8A:
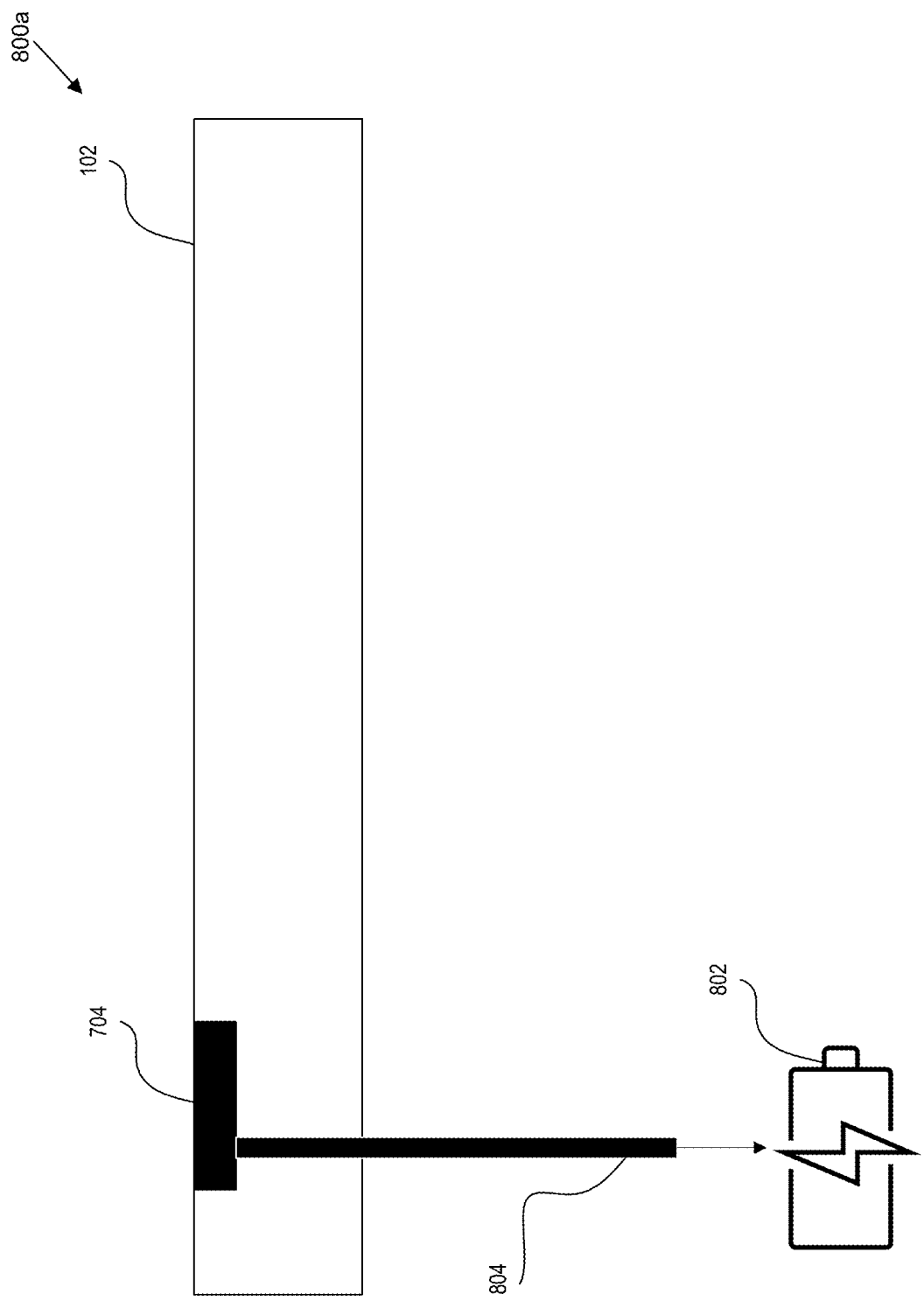
FIG. 8*a* illustrates a block diagram of a wired embedded sensor.

FIG. 8*a* illustrates a block diagram 800*a* of a wired embedded sensor 704. The sensor 704 can be embedded into the surface of the ballistic sub-panel 102 to allow the sensor 704 to be flush with the surface. An electrical wire 804 can be attached to the sensor 704. The electrical wire 804 can connect the sensor 704 to a power source 802 by going through the surface of the ballistic sub-panel 102. The power source 802 can be remotely located from the sensor 704.

Figure 8B:
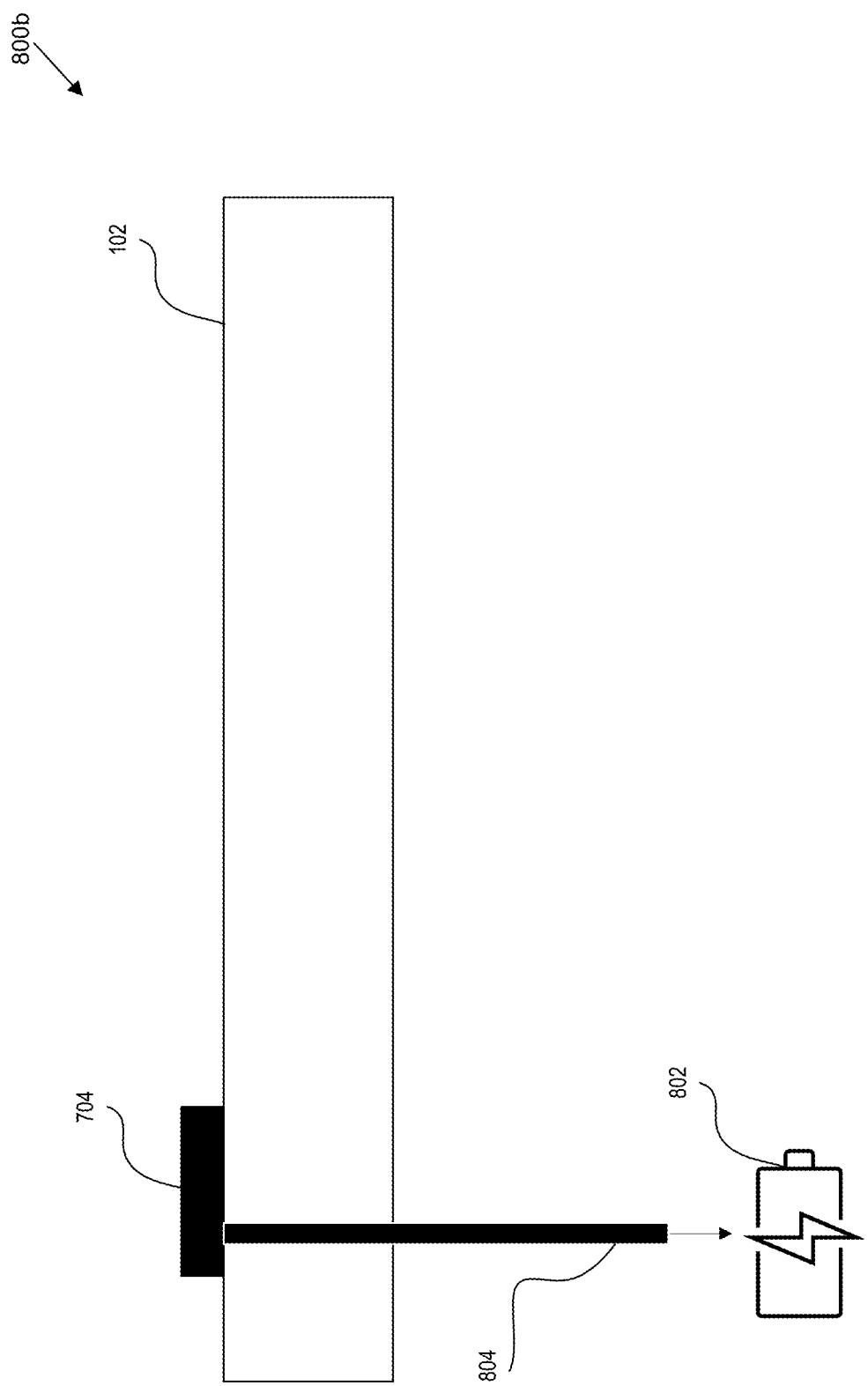
FIG. 8*b* illustrates a block diagram of a wired sensor mounted to the surface of the ballistic sub-panel.

FIG. 8*b* illustrates a block diagram 800*b* of a wired sensor 704 mounted to the surface of the ballistic sub-panel 102. Mounting the sensor 704 to the surface of the ballistic sub-panel 102 can allow the sensor to be more easily replaced compared to an embedded sensor configuration. An electrical wire 804 can be attached to the sensor 704. The electrical wire 804 can connect the sensor 704 to a power source 802 by going through the surface of the ballistic sub-panel 102. The power source 802 can be remotely located from the sensor 704.

Figure 8C:
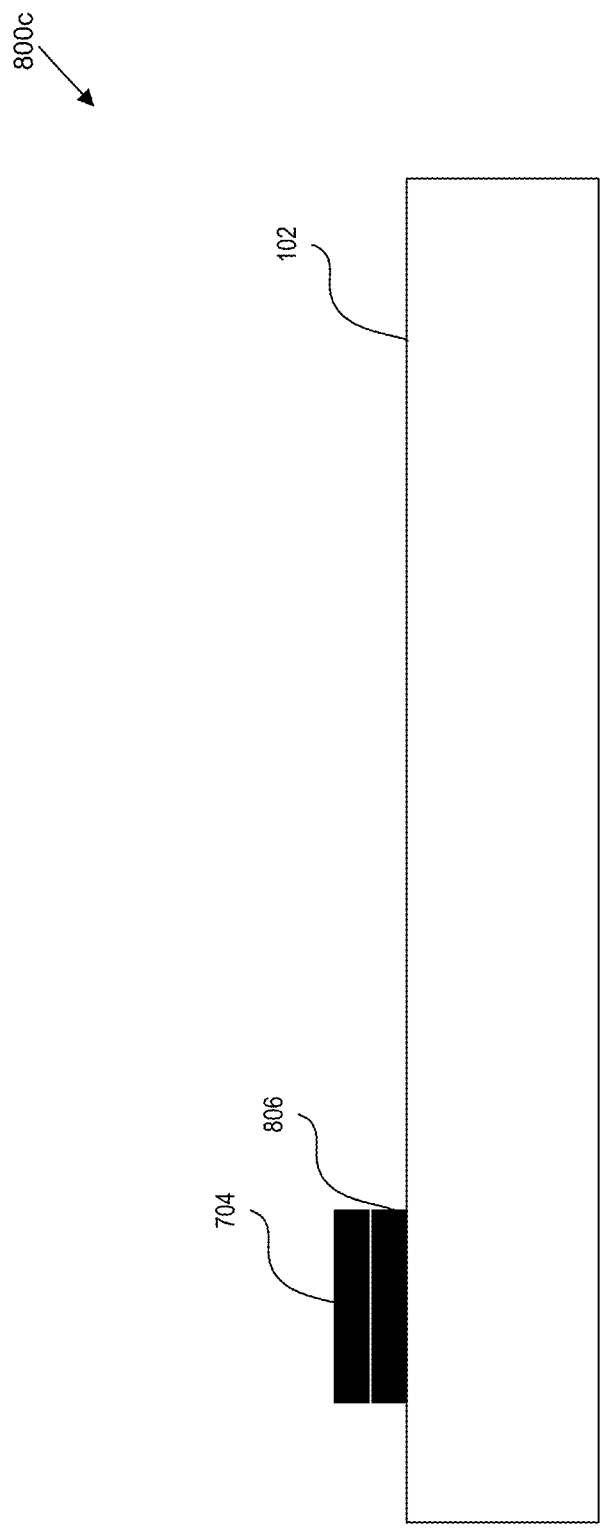
FIG. 8*c* illustrates a block diagram of a sensor mounted to the surface of the ballistic sub-panel.

FIG. 8*c* illustrates a block diagram 800*c* of a sensor 704 mounted to the surface of the ballistic sub-panel 102. Mounting the sensor 704 to the surface of the ballistic sub-panel 102 can allow the sensor to be more easily replaced compared to an embedded sensor configuration. A battery 806 can be coupled directly to the sensor 704. For example, the battery 806 can be mounted underneath the sensor 704 and can be mounted to the surface of the ballistic sub-panel 102. Coupling the battery 806 directly to the sensor 704 prevents the need to have a wire going through the ballistic sub-panel 102.

Figure 8D:
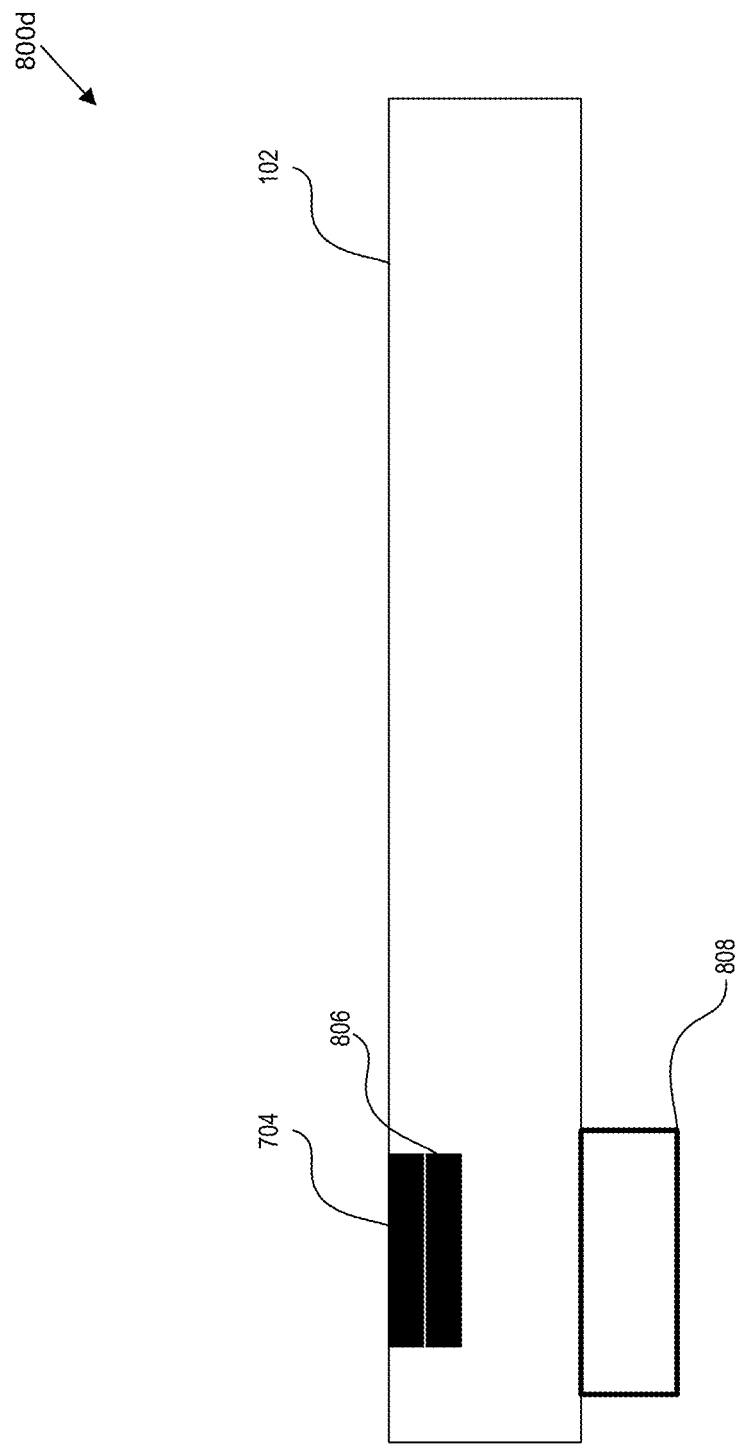
FIG. 8*d* illustrates a block diagram of an embedded sensor.

FIG. 8*d* illustrates a block diagram 800*d* of an embedded sensor 704. The sensor 704 can be embedded into the surface of the ballistic sub-panel 102 to allow the sensor 704 to be flush with the surface. A battery 806 can be coupled directly to the sensor 704. For example, the battery 806 can be mounted underneath the sensor 704 and can be embedded into the surface of the ballistic sub-panel 102. Coupling the battery 806 directly to the sensor 704 prevents the need to have a wire going through the ballistic sub-panel 102. A ballistic reinforcement panel 808 can be added to the ballistic sub-panel 102. The ballistic reinforcement panel 808 can provide added ballistic protection in the location of the wireless embedded sensor 704.

Figure 9:
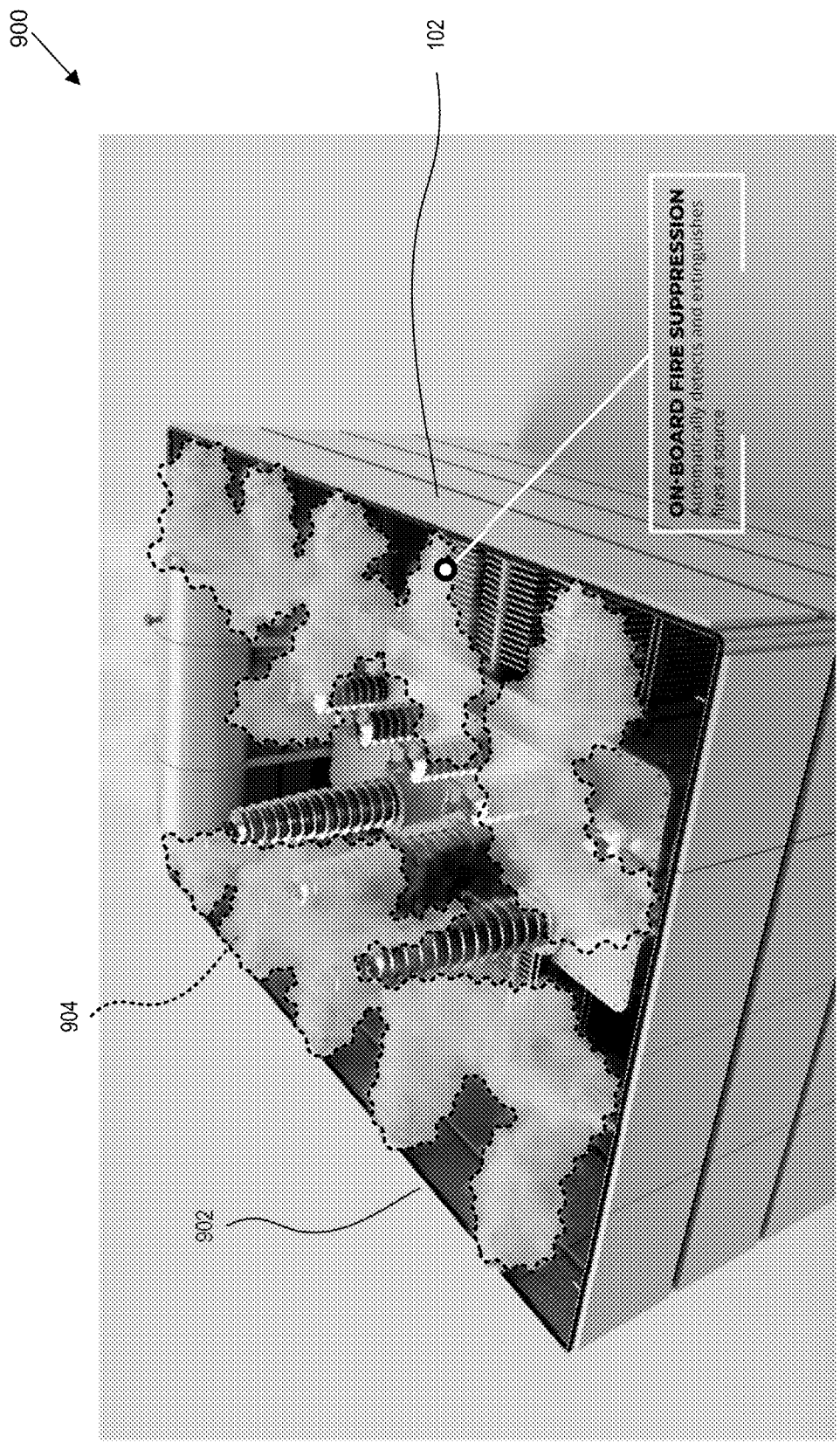
FIG. 9 illustrates an embodiment of an onboard fire suppression system.

FIG. 9 illustrates an embodiment of an onboard fire suppression system 900 integrated into the ballistic barrier system. The fire suppression system 900 can be configured to respond to explosive or continuous fire events. The fire suppression system can be any suitable system or device for detecting a fire condition and releasing a fire-suppressant material in response to a detected condition such as a fire. The fire suppression system can be configured to generate a signal corresponding to the detected fire condition and communicate the signal to an emergency service, security system, or other appropriate party.

In one embodiment, the fire suppression system can include an active system having multiple sensors configured to detect a fire condition or explosive event. The sensors can include any suitable device, such as fire/smoke detectors, thermally sensitive devices, cameras, or any other suitable detection device. The sensors can be arranged around the ballistic barrier system along interior- or exterior-facing surfaces of one or more modular panels 102. Upon detecting a fire condition or explosive event by a sensor, the sensor can generate an electronic signal and communicate the signal to a fire control subsystem. In response, the fire control subsystem can initiate the release of a fire-suppressant material through a set of tubing 902 comprising a series of openings suitably configured to disperse the fire-suppressant material into the environment to suppress or fully extinguish the fire condition.

Alternatively, one or more nozzles 904 may be attached to or otherwise coupled to the tubing 902 to disperse the released fire-suppressant material. The fire suppression system can be configured to determine the location of the sensor(s) that detected the fire condition and direct the fire-suppressant material to the nozzle(s) 904 located in the immediate area of the detected fire condition.

In an alternative embodiment, the fire suppression system can include a passive system configured to detect a fire condition and release a fire-suppressant material without the use of electricity or electronically generated detection signals. For example, the fire suppression system can include a pneumatically activated fire control tubing system. A heat-sensitive tube can be routed around the modular panels 102 and coupled to a pressurized fire bottle holding a fire-suppressant material. In the event of a fire condition, direct exposure of the heat-sensitive tube at a location of the fire event causes the tube to burst. The loss in pressure of the fire control tubing system can activate a valve connected to the fire bottle, allowing the release of the fire suppressant from the fire bottle into the tubing system. The fire suppressant is then released from the burst portion of the heat-sensitive tube and into the area of the fire condition. The heat-sensitive tube can be coupled to a plurality of nozzles 904 configured to disperse the fire suppressant. For example, the fire-suppressant can be released over a wider area as compared to the location of the tube that was burst by the fire condition.

Figure 10:
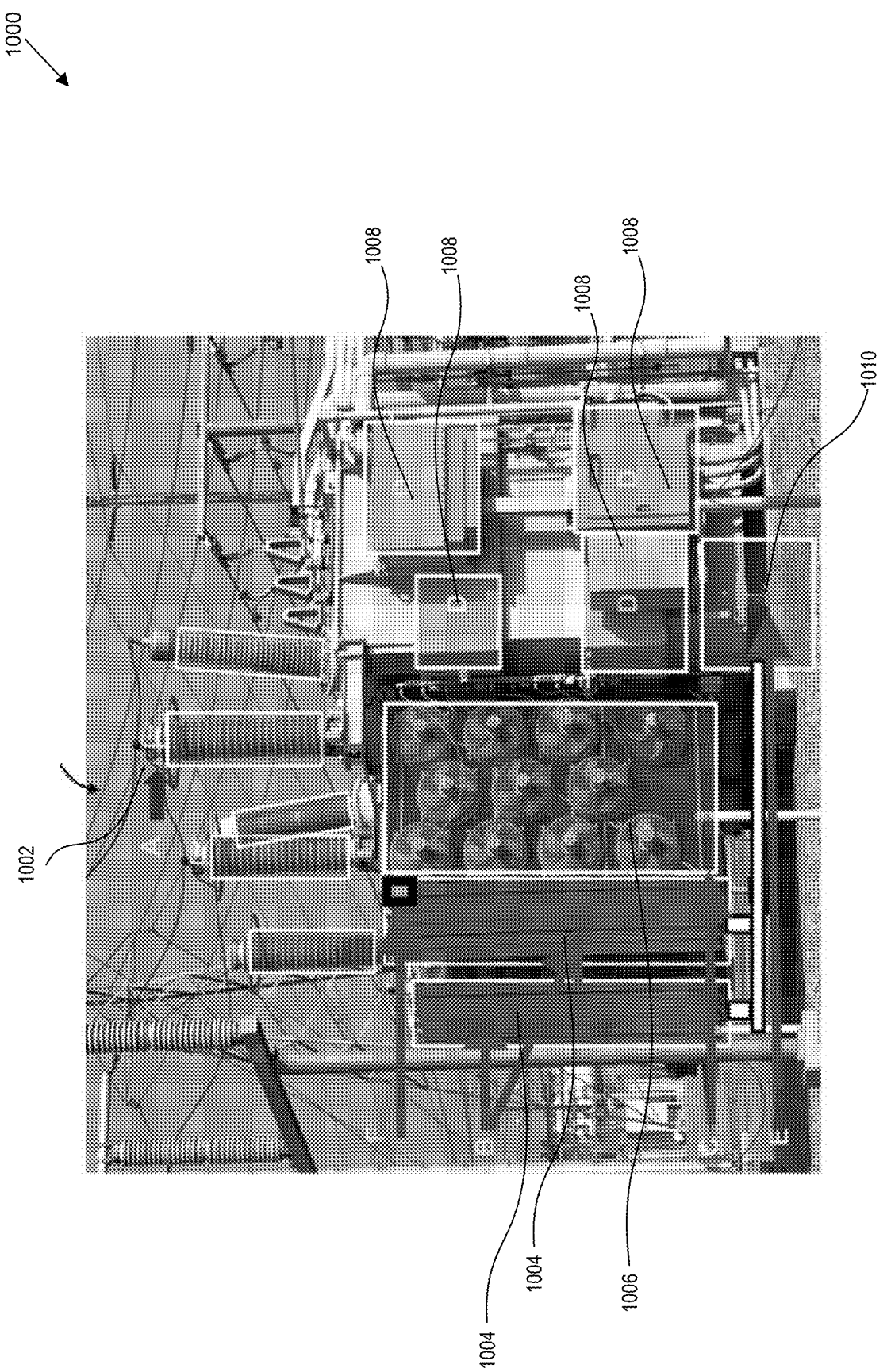
FIG. 10 illustrates an embodiment of the ballistic barrier panel system.

FIG. 10 illustrates an embodiment 1000 of the ballistic barrier panel system where the modular panels are mounted directly to individual components of an energy transmission equipment. The embodiment 1000 can include one or more panels, barriers, or protective elements suitably configured to protect various portions of an electrical substation. In one embodiment, individual ballistic sub-panels can be designed to conform in shape to equipment structures or housings 1008 and placed directly onto or immediately adjacent to critical electrical power grid equipment and systems. For example, the ballistic sub-panels can be mounted to a radiator 1004 or other energy transmission equipment 1006. In one embodiment, ballistic sub-panels can be positioned with a specified distance (standoff) between the ballistic sub-panel and the equipment being protected to allow for airflow through or around the equipment.

In one embodiment, high and low voltage is conducted through bushing structures 1002 located above or near high-voltage transformers and switches. For example, a grounding structure 1010 can be included to ground electrical currents conducted through the bushing. The bushings include ceramic "rings" surrounding the charged cable that can also require ballistic protection. A bushing ballistic sub-panel can be configured to surround the bushing without contacting the bushing. Attachment points for the panel can be positioned at the top or bottom of the bushing support structure. The space between the bushing and the ballistic sub-panel can allow for rain runoff to facilitate cleaning. The bushing ballistic sub-panel can be formed in two halves that can be selectively connected or separated from each other to allow for maintenance and repair.

For example, the bushing ballistic sub-panel can include a ballistic material shaped as a complete cylinder or as two clamshell pieces that can be coupled together. The bushing ballistic sub-panel can attach directly to a transformer or breaker unit. A gap/standoff between the bushing ballistic sub-panel and an insulator or bushing can allow for material deformation resulting from a ballistic impact. In one embodiment, the bushing ballistic sub-panel can include a transparent ballistic material such as polycarbonate glass used for all or a portion of the guard to allow visual inspection of critical points.

The ballistic barrier system can communicate the occurrence of a ballistic event through the use of one or more onboard sensors capable of detecting a gunshot, blast, or other ballistic event. Sensors can be positioned on individual sub-panels or in a location on the modular panel system that allows the sensor to detect a ballistic event for multiple ballistic sub-panels. Sensors can include any suitable system or device for detecting a ballistic event, such as microphones, impact sensors, accelerometers, or similar sensors. When a ballistic event is detected, the sensors can be configured to autonomously notify any appropriate person or entity, such as emergency services, first responders, security personnel, and other stakeholders. The sensor can be configured to wirelessly transmit data concerning the detected event, such as location, time, equipment involved, or the type of event detected. In response to a detected event, the sensor can be configured to activate one or more onboard cameras to record and transmit visual information regarding the detected event and/or provide instruction to other physical security access control elements.

In another embodiment, a ballistic sub-panel can be attached to an interior surface of a logic control cabinet or housings 1008 for backup battery systems. Some of the equipment systems require not only ballistic protection but insulation from severe temperatures. A ballistic sub-panel can be configured to provide an R-value by incorporating an insulation component to the front and/or rear of the ballistic sub-panel. The ballistic sub-panel can be mounted to the interior of the housings 1008 with fasteners or other attachment systems. In another embodiment, the ballistic sub-panels can be shaped to conform to the outer surface of tanks that reserve and circulate coolants, such as oil, for equipment such as high-voltage transformers.

Figure 11:
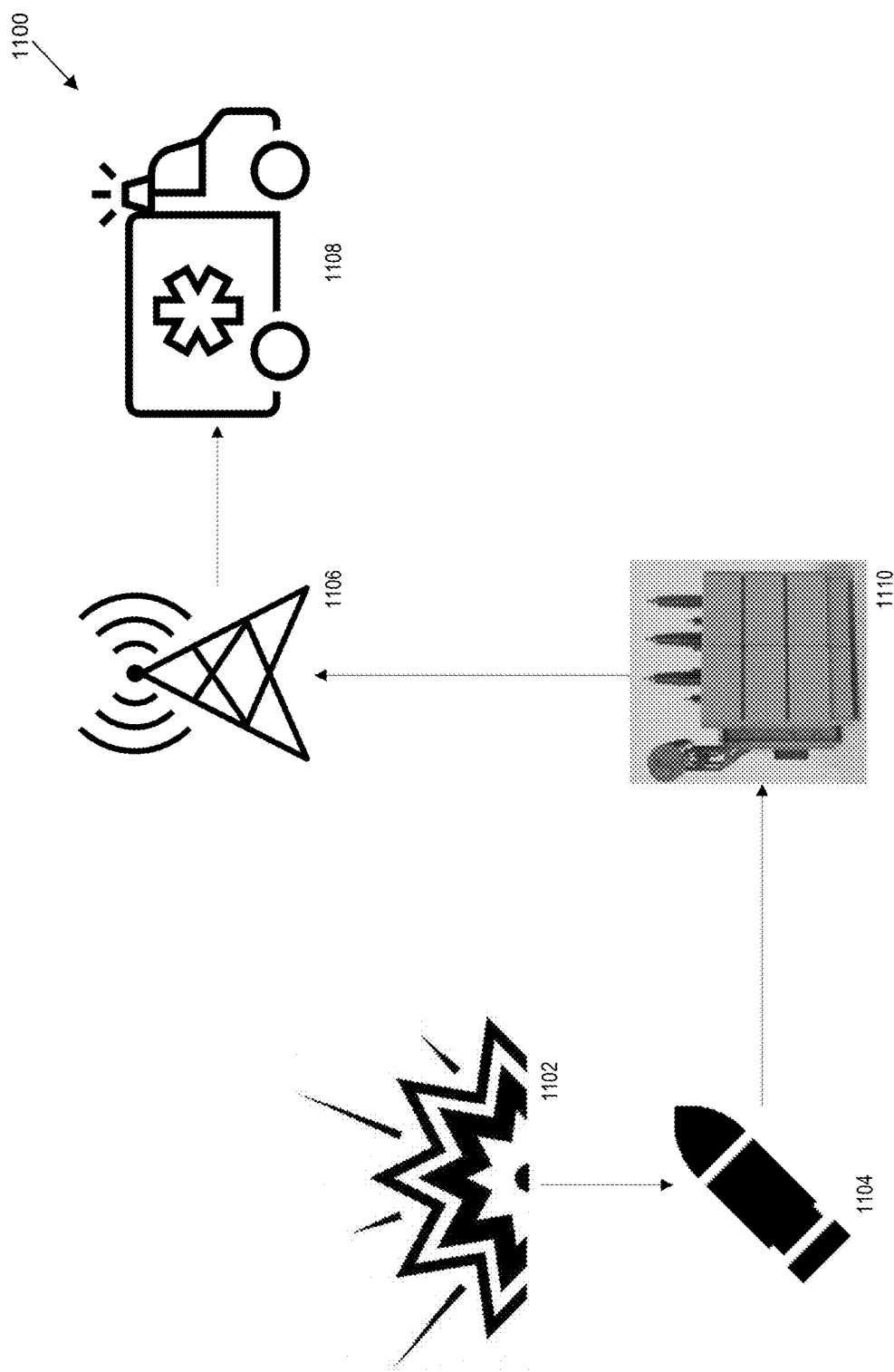
FIG. 11 is a block diagram of the notification system.

FIG. 11 illustrates a block diagram 1100 of a notification generated by the notification system when a ballistic event occurs. A ballistic event 1102 can occur near the ballistic barrier system 1110. Ballistic projectile 1104, such as a bullet or shrapnel, can either make contact with the ballistic barrier system 1110 or come into the vicinity of the ballistic barrier system 1110. The ballistic barrier system 1110 can determine that a ballistic event occurred through the use of a sensor. For example, the sensor can be an energy-wave detection sensor capable of measuring the energy level and energy waveform generated from a ballistic event. In one embodiment, the sensor is controlled by a computer or control system. The ballistic barrier system 1110 can determine if a ballistic event occurred based on the received data from the sensor. For example, based on the received data from the sensor, the computer can determine the severity of the ballistic event and the distance the ballistic barrier system 1110 is from the ballistic event, and based on the determination, the ballistic barrier system 1110 can determine whether emergency services 1108 should be notified. In another embodiment, the sensor can activate a camera to record and transmit visual information regarding the detected event.

A communication system can be attached to the sensor. For example, the communication device can be a cellular modem. A cellular modem allows the ballistic barrier system 1110 to connect directly with a wireless network 1106. A notification system can generate a notification based on the ballistic event. The communication system can transmit the notification to the emergency services 1108. In one embodiment, a computer or control system controls the communication system and notification system.

When a ballistic event 1102 is detected by the ballistic barrier system 1110, the communication system can notify emergency services 1108 through the wireless network 1106. For example, the emergency services 1108 can be the police department, fire department, a hospital, private service, the owner of the barrier system 1110, or any other emergency service. In one embodiment, the control system can be configured to wirelessly transmit data collected by the sensor concerning the detected event, such as location, time, or the type of event detected over the wireless network 1106 to the emergency services 1108.

Protecting against ballistic events and notifying emergency services or another entity can reduce the amount of emitted greenhouse gases by reducing the number of outages of energy transmission equipment caused by ballistic events and subsequent reliance on gasoline generators. Notifying an emergency service or another entity additionally reduces the amount of time for which energy transmission equipment is offline due to a ballistic event. Reducing the amount of time offline subsequently reduces the amount of time for which an individual needs to rely on gasoline generators for power, which reduces the amount of greenhouse gases emitted.

Computer System

Figure 12:
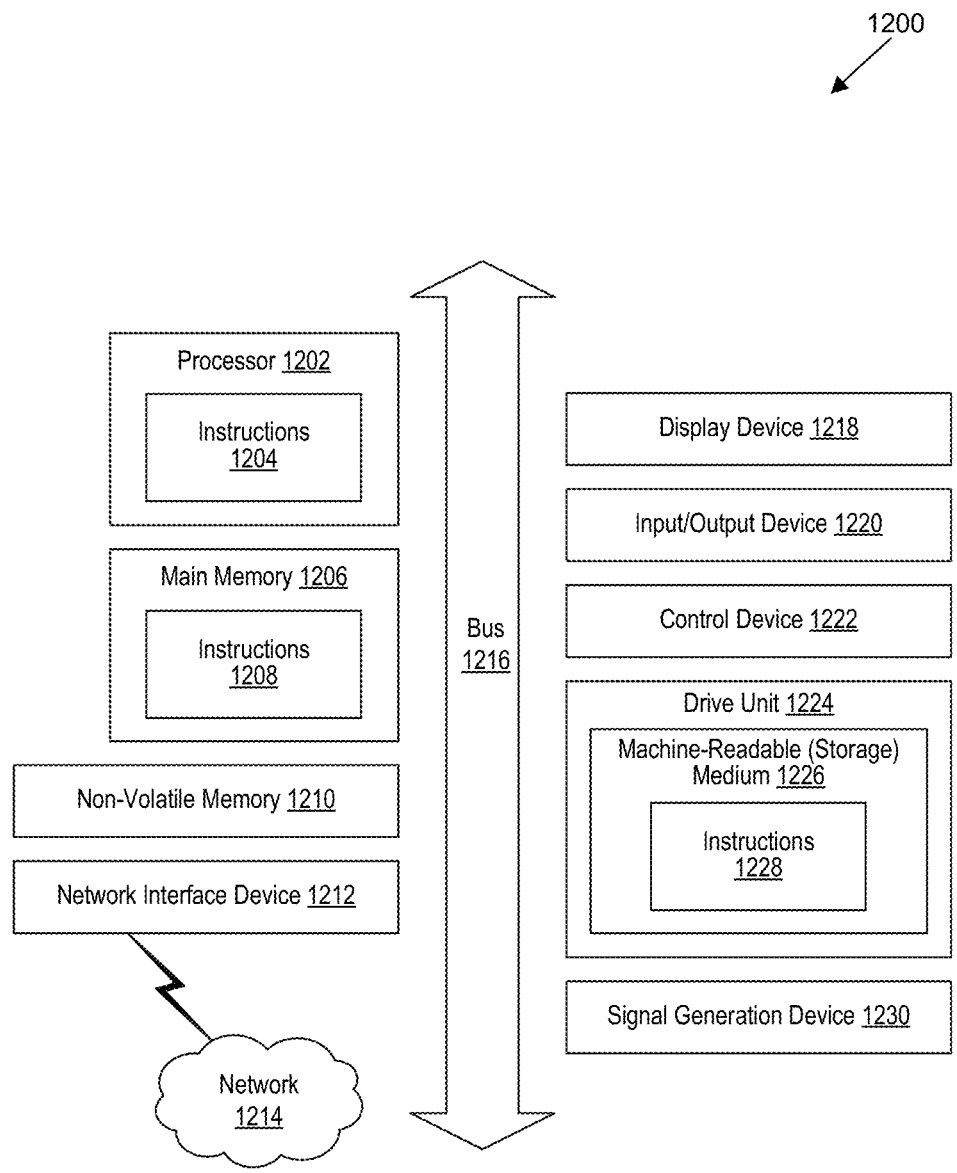
FIG. 12 is a block diagram that illustrates components of a computing device.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, a video display device 1218, an input/output device 1220, a control device 1222 (e.g., keyboard and pointing device), a drive unit 1224 that includes a machine-readable (storage) medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in this specification can be implemented.

The computer system 1200 can take any suitable physical form. For example, the computing system 1200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1200. In some implementations, the computer system 1200 can be an embedded computer system, a system-on-chip (SOC), a single-board computer system (SBC), or a distributed system such as a mesh of computer systems, or it can include one or more cloud components in one or more networks. Where appropriate, one or more computer systems 1200 can perform operations in real time, in near real time, or in batch mode.

The network interface device 1212 enables the computing system 1200 to mediate data in a network 1214 with an entity that is external to the computing system 1200 through any communication protocol supported by the computing system 1200 and the external entity. Examples of the network interface device 1212 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/or associated caches and servers) that store one or more sets of instructions 1228. The machine-readable medium 1226 can include any medium that is capable of storing, encoding, or carrying a set of instructions for execution by the computing system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computing system 1200 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A ballistic barrier system comprising:
   a mounting frame configured to couple to an energy transmission equipment, wherein the mounting frame is suspended above a ground level;
   a modular panel configured to removably attach to the mounting frame and removably interconnect with other modular panels to form a barrier around at least a portion of the energy transmission equipment,
      wherein, when attached to the mounting frame, the modular panel is suspended above the ground level, and
      wherein the modular panel includes:
         multiple ballistic sub-panels that are configured to removably attach to the modular panel and interconnect with each other to increase a surface area of the modular panel,
            wherein the multiple ballistic sub-panels include a first sub-panel disposed in a first plane, a second sub-panel disposed in the first plane, and a third sub-panel disposed in a second plane that is positioned away from the first plane, and
            wherein each of the multiple ballistic sub-panels is constructed of a ballistic-resistant material; and
         multiple spacers extending between the first plane and the second plane,
            wherein a first spacer of the multiple spacers extends between the first sub-panel and the third sub-panel,
            wherein a second spacer of the multiple spacers extends between the second sub-panel and the third sub-panel; and
      a ballistic detection system comprising:
         at least one sensor configured to detect a ballistic energy level and an energy-waveform of a ballistic event, wherein the at least one sensor is mounted to the modular panel;
         a notification system configured to communicate a notification to an emergency service in response to the at least one sensor detecting the ballistic event, wherein the notification system comprises:
            a modem configured to wirelessly connect the ballistic barrier system to the emergency service over a wireless network; and
         a controller configured to determine a severity of the ballistic event and activate the notification system; and
         a power supply configured to supply power to the ballistic detection system.

2. The ballistic barrier system of claim 1 further comprising:
   a fire suppression system coupled to the modular panel and including:
      a fire detection sensor configured to detect a fire event at the energy transmission equipment,
         wherein the fire detection sensor includes a smoke detector, a thermally sensitive device, or a camera; and
      a fire control subsystem configured to cause release of a fire suppression material at the energy transmission equipment in response to detection of the fire event, wherein the fire suppression material is rated for use on electrical equipment.

3. The ballistic barrier system of claim 1, wherein a ballistic sub-panel further comprises:
   a solar reflecting material coating,
      wherein the solar reflecting material coating is configured to reduce an amount of heat transferred to the energy transmission equipment by reflecting an amount of solar energy; and
   an insulating material having a predetermined thermal resistance (R) value,
      wherein the insulating material is configured to reduce a temperature of the energy transmission equipment.

4. The ballistic barrier system of claim 1, wherein the ballistic panel system is configured to reduce an amount of emitted greenhouse gases by reducing a number of outages of energy transmission equipment caused by ballistic events and a subsequent reliance on gasoline generators.

5. The ballistic barrier system of claim 1, wherein coupling the mounting frame to the energy transmission equipment comprises:
   multiple framing members configured to be coupled to a structural component of the energy transmission equipment,
      wherein the structural component of the energy transmission equipment includes I-beams or H-beams,
      wherein coupling the multiple framing members to the structural component suspends the ballistic barrier above the ground level.

6. The ballistic barrier system of claim 1, wherein a mounting method of the at least one sensor to the ballistic sub-panel includes:
   embedding the at least one sensor into the surface of the ballistic sub-panel,
   disposing the at least one sensor onto the surface of the ballistic sub-panel, or
   removably attaching the at least one sensor into the surface of the ballistic sub-panel.

7. The ballistic barrier system of claim 1, wherein the at least one sensor includes:
   an energy-wave detector,
   a microphone,
   a camera, or
   a pressure sensor.

8. The ballistic barrier system of claim 1, wherein each ballistic sub-panel further comprises:

an interlocking mechanism configured to removably couple to either another ballistic sub-panel or the modular panel, and
  wherein interlocking mechanism allows for air flow through the modular panel.
9. A hazard barrier comprising:
a mounting frame suspended above a ground level;
a modular panel configured to removably attach to the mounting frame and removably interconnect with other modular panels to form a barrier,
  wherein the modular panel includes:
    multiple hazard sub-panels that are configured to removably attach to the modular panel and interconnect with each other to increase a surface area of the modular panel,
      wherein the multiple hazard sub-panels include a first sub-panel disposed in a first plane, a second sub-panel disposed in the first plane, and a third sub-panel disposed in a second plane that is positioned away from the first plane, and
      wherein each of the multiple hazard sub-panels is constructed of a hazard-resistant material; and
    multiple spacers extending between the first plane and the second plane,
      wherein a first spacer of the multiple spacers extends between the first sub-panel and the third sub-panel,
      wherein a second spacer of the multiple spacers extends between the second sub-panel and the third sub-panel; and
a hazard detection system comprising:
  at least one sensor configured to detect a hazard event in a vicinity of the hazard barrier,
    wherein the at least one sensor is mounted to the modular panel;
  a notification system configured to communicate a notification to an emergency service in response to the at least one sensor detecting the hazard event; and
  a power supply configured to supply power to the hazard detection system.
10. The hazard barrier of claim 9 further comprising:
a fire suppression system coupled to the modular panel and including:
  a fire detection sensor configured to detect a fire event,
    wherein the fire detection sensor includes a smoke detector, a thermally sensitive device, or a camera; and
  a fire control subsystem configured to cause release of a fire suppression material at the energy transmission equipment in response to detection of the fire event.
11. The hazard barrier of claim 9, wherein the mounting frame further comprises:
multiple frame members configured to be coupled to a structural component of a structure,
  wherein the structural component of includes I-beams or H-beams,
  wherein coupling the multiple framing members to the structural component suspends the hazard barrier above the ground level.
12. The hazard barrier of claim 9, wherein a mounting method of the at least one sensor to the hazard sub-panel includes:
  embedding the at least one sensor into the surface of the hazard sub-panel,
  disposing the at least one sensor onto the surface of the ballistic sub-panel, or
  removably attaching the at least one sensor into the surface of the ballistic sub-panel.
13. The hazard barrier of claim 9, wherein the at least one sensor includes:
  an energy-wave detector,
  a microphone,
  a camera, or
  a pressure sensor.
14. The hazard barrier of claim 9, wherein each ballistic sub-panel further comprises:
  an interlocking mechanism configured to removably couple to either another ballistic sub-panel or the modular panel, and
  wherein interlocking mechanism allows for air flow through the modular panel.
15. An apparatus for ballistic protection comprising:
a mounting frame configured to couple to an energy transmission equipment, wherein the mounting frame is suspended above a ground level;
a modular panel configured to removably attach to the mounting frame and removably interconnect with other modular panels to form a barrier around at least a portion of the energy transmission equipment,
  wherein, when attached to the mounting frame, the modular panel is suspended above the ground level, and
  wherein the modular panel includes:
    multiple ballistic sub-panels that are configured to removably attach to the modular panel and interconnect with each other to increase a surface area of the modular panel,
      wherein the multiple ballistic sub-panels include a first sub-panel disposed in a first plane, a second sub-panel disposed in the first plane, and a third sub-panel disposed in a second plane that is positioned away from the first plane, and
      wherein each of the multiple ballistic sub-panels is constructed of a ballistic-resistant material; and
    multiple spacers extending between the first plane and the second plane,
      wherein a first spacer of the multiple spacers extends between the first sub-panel and the third sub-panel,
      wherein a second spacer of the multiple spacers extends between the second sub-panel and the third sub-panel; and
a ballistic detection system comprising:
  at least one sensor configured to detect a ballistic energy level and an energy-waveform of a ballistic event,
    wherein the at least one sensor is mounted to the modular panel;
  a notification system configured to communicate a notification to an emergency service in response to the at least one sensor detecting the ballistic event,
    wherein the notification system comprises:
      a modem configured to wirelessly connect the ballistic barrier system to the emergency service over a wireless network; and
  a controller configured to determine a severity of the ballistic event and activate the notification system; and
a power supply configured to supply power to the ballistic detection system.
16. The apparatus of claim 15 further comprising:
a fire suppression system coupled to the modular panel and including:

a fire detection sensor configured to detect a fire event at the energy transmission equipment,
wherein the fire detection sensor includes a smoke detector, a thermally sensitive device, or a camera; and
a fire control subsystem configured to cause release of a fire suppression material at the energy transmission equipment in response to detection of the fire event,
wherein the fire suppression material is rated for use on electrical equipment.

17. The apparatus of claim 15, wherein a ballistic sub-panel further comprises:
a solar reflecting material coating,
wherein the solar reflecting material coating is configured to reduce an amount of heat transferred to the energy transmission equipment by reflecting an amount of solar energy; and
an insulating material having a predetermined thermal resistance (R) value,
wherein the insulating material is configured to reduce a temperature of the energy transmission equipment.

18. The apparatus of claim 15, wherein coupling the mounting frame to the energy transmission equipment comprises:
multiple frame members configured to be coupled to a structural component of the energy transmission equipment,
wherein the structural component of the energy transmission equipment includes I-beams or H-beams,
wherein coupling the multiple framing members to the structural component suspends the ballistic barrier above the ground level.

19. The apparatus of claim 15, wherein a mounting method of the at least one sensor to the ballistic sub-panel includes:
embedding the at least one sensor into the surface of the ballistic sub-panel,
disposing the at least one sensor onto the surface of the ballistic sub-panel, or
removably attaching the at least one sensor into the surface of the ballistic sub-panel.

20. The apparatus of claim 15, wherein each ballistic sub-panel further comprises:
an interlocking mechanism configured to removably couple to either another ballistic sub-panel or the modular panel, and
wherein interlocking mechanism allows for air flow through the modular panel.

* * * * *